(12) United States Patent
Georgeson et al.

(10) Patent No.: US 7,246,631 B2
(45) Date of Patent: Jul. 24, 2007

(54) ADHESIVE MIX MONITOR

(75) Inventors: Gary E. Georgeson, Federal Way, WA (US); Charles M. Richards, Kent, WA (US); Richard H. Bossi, Renton, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 11/024,333

(22) Filed: Dec. 22, 2004

(65) Prior Publication Data

US 2006/0130897 A1    Jun. 22, 2006

(51) Int. Cl.
*G05D 11/13*    (2006.01)
(52) U.S. Cl. .................. 137/5; 73/61.42; 73/61.71; 137/93
(58) Field of Classification Search ............. 137/5, 137/88, 93; 73/61.42, 61.71
See application file for complete search history.

(56) References Cited

U.S. PATENT DOCUMENTS

| | | | | |
|---|---|---|---|---|
| 3,690,340 A | * | 9/1972 | Sipin ........................ | 137/93 |
| 4,121,767 A | * | 10/1978 | Jensen ..................... | 137/93 |
| 5,129,415 A | * | 7/1992 | Runyon et al. ............ | 137/113 |
| 5,215,253 A | * | 6/1993 | Saidman et al. .......... | 239/61 |
| 5,288,769 A | * | 2/1994 | Papageorge et al. ...... | 523/200 |
| 5,985,155 A | * | 11/1999 | Maitland .................. | 210/739 |
| 6,374,845 B1 | * | 4/2002 | Melendez et al. ......... | 137/3 |

OTHER PUBLICATIONS

Loctite Aerospace, Hysol EA 9394 Description and information brochure, Jun. 2002; 4 pages, Bay Point, California.
Loctite Aerospace, Hysol Surface Preparation Guide, undated, 2 pages, Bay Point, California.

* cited by examiner

*Primary Examiner*—Stephen M. Hepperle
(74) *Attorney, Agent, or Firm*—Harness, Dickey & Pierce, P.L.C.

(57) ABSTRACT

A system for measuring a mixture ratio associated with a two-part fluid, at least one of the two parts including conductive particles. The system includes a pair of electrodes, a circuit, and an output. The electrodes are disposed on opposite sides of the two-part fluid and sense the dielectric strength of the fluid. The circuit communicates with the electrodes to sense the dielectric strength and outputs a signal representing the dielectric strength. Preferably, the circuit includes a capacitive bridge, an input for a set-point, and an output for an error signal. Also, the system can include a housing for the electrodes. A timer may also be provided to measure the time elapsed from the beginning of the mixing of the two-part fluid. Preferably, the two-part fluid is an adhesive with aluminum particles that is made from a resin and a hardener. Methods of producing two-part fluids are also provided.

20 Claims, 5 Drawing Sheets

ADHESIVE MIX MONITOR

FIELD OF THE INVENTION

This discloser relates generally to mixing multi-part fluids and, more particularly, to mixing two-part fluids in which one of the two parts includes conductive particles.

BACKGROUND

Two-part adhesives provide high strength joints that require little, if any, machining to assemble. Typically, the two-part adhesive is made at or just before the time the adhesive must be applied to the mating surfaces of the joint. Appropriate quantities of the two parts are brought into contact and mixed thoroughly. Once mixed, the two-part fluid begins to harden (or cure or set) and must be applied to the joint before the cure becomes too advanced. Accordingly, the two-part adhesive is usually applied to one of the surfaces immediately and the two surfaces are clamped together for the required time to cure the adhesive. After the adhesive cures, the surfaces are unclamped and the assembled joint is used in higher level assemblies.

In some applications the adhesive joint must conduct either electricity, heat, or both electricity and heat while carrying a load. Because of the nature of the compounds formed in these two-part fluids, they typically do not have both the desired load carrying properties and the desired thermal or electric conductivity needed for various specific applications. To provide the desired conductivity, conductive particles are frequently introduced into one of the two pre-mix parts of the adhesive. The concentration of particles is pre-determined so that when the two parts are mixed, the particles are of a sufficient concentration to provide the desired conductivity. Frequently, though, the mixture ratio of the two-part fluid varies due to disturbances in the mixing system and other sources of error. When the mixture ratio varies from the optimum, the concentration of the conductive particles also changes. As a result, the conductivity of the joint is affected. Likewise, the load carrying capabilities of the joint can change also.

In many applications, an automated mixer is used to mix batches of the two-part adhesive. Typically, the flow rate of each of the two parts of the mixture is determined at the beginning of the production run and again at the end of the run. While these spot checks detect some variations from the optimum mixture ratio, the spot checks do not continuously monitor the system. If a variation occurs between the initial and final checks, non-optimum adhesive can be created and applied to the joint(s) being made with the adhesive.

Because the mixture ratio influences the properties of the joint, monitoring the mixture ratio of two-part fluids in real time and on a continuous basis would improve quality and reduce post-cure inspection processes.

SUMMARY

The present disclosure provides apparatus and methods for monitoring the mixing of multi-part fluids. In a first embodiment, a system is provided for mixing a two-part epoxy adhesive. The system includes an automatic mixer that has two reservoirs, one for the resin and one for the hardener. Pumps force the two materials through metered nozzles and then into a static mixing tube. At the end of the static mixing tube a sensor monitors the mixture ratio of the mixed two-part fluid to ensure that the adhesive is at the proper mixture ratio. A hose can be attached to the end of the static mixing tube to pump the adhesive to the bond locations of the joint. More particularly, the present disclosure invention provides an in-line mix monitor for use with HYSOL® EA 9394 two-part epoxy available from the Henkel Loctite Corporation of Dusseldorf, Germany. This embodiment takes advantage of the fine particles of aluminum that the EA 9394 epoxy hardener contains to sense the mixture ratio of the mixed EA 9394 epoxy. These principles apply to any multi-part fluid (e.g. a potting material) in which one part contains conductive material.

In a second embodiment, a system is provided for measuring a mixture ratio associated with a two-part fluid, in which at least one of the two-parts includes conductive particles. The system includes a pair of electrodes, a circuit, and an output. The electrodes are disposed on opposite sides of the two-part fluid and sense the dielectric strength of the fluid. The circuit communicates with the electrodes to sense the dielectric strength and outputs a signal representing the dielectric strength. Preferably, the circuit includes a capacitive bridge, an input for a set-point, and an output for an error signal. Also, the system can include a housing for the electrodes. A timer may be provided to measure the time elapsed from the beginning of the mixing of the two-part fluid. Preferably, the two-part fluid is an adhesive made from a resin and a hardener, one of which contains conductive particles.

In a third embodiment, a two-part fluid producing system is provided. The system includes a source for the first part of the two-part fluid, a source for a second part of the fluid, a mixer, a sensor, and an output. In the present embodiment, the first part of the fluid contains conductive particles which, preferably, are aluminum. The mixer communicates with both sources to mix the two parts. The sensor communicates with the mixer, receives the mixed two-part fluid, and senses the dielectric strength of the fluid. The sensor also outputs a signal that is representative of the sensed dielectric strength. Preferably, the system includes an input for a set-point and a fluid control device that adjusts the amount of one of the parts of the two-part fluid based on the set-point and the dielectric strength of the fluid. A timer for measuring the elapsed time from the beginning of the mixing operation may also be included in the system.

The present disclosure also involves a method of producing a two-part fluid. The method generally includes mixing the parts of the fluid, sensing the dielectric strength of the mixed fluid, and determining a mixture ratio from the sensed dielectric strength. Preferably, the mixing is adjusted based on the determined mixture ratio and a pre-selected set-point. The time since the mixing began may also be measured.

Further features and advantages of the present disclosure, as well as the structure and operation the of various embodiments presented herein, are described in detail with reference to the accompanying drawings.

BRIEF DESCRIPTION OF THE DRAWINGS

The accompanying drawings, which are incorporated in and form a part of the specification, illustrate exemplary embodiments of the present disclosure. In the drawings.

DETAILED DESCRIPTION

Figure 1:
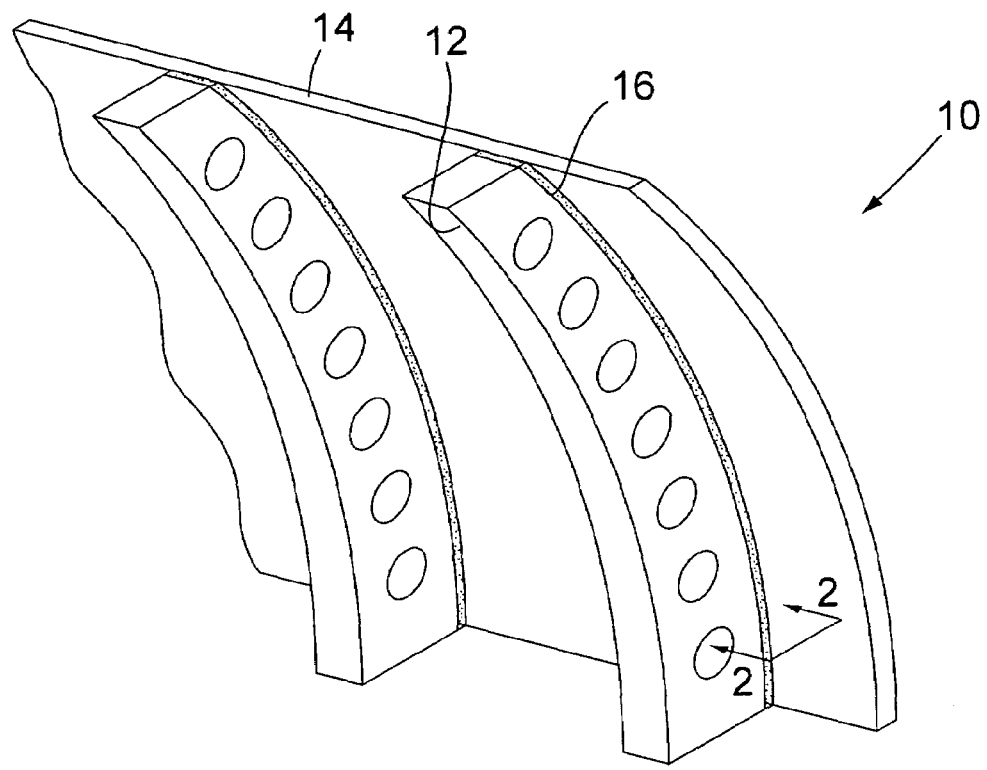
FIG. 1 illustrates a structure assembled with a two-part adhesive that was mixed in accordance with the principles of the present disclosure.

Referring to the accompanying drawings in which like reference numbers indicate like elements, FIG. 1 illustrates a joint constructed in accordance with the principles of the present disclosure.

During the assembly of an aircraft it is often desirable to use room temperature paste bonding (with, for example, an epoxy adhesive) of the primary aerospace structures rather than fasteners for assembly. The advantages of using paste bonding include a reduction in the overall weight of the assembled aircraft and a reduction in the expense of assembling the aircraft. If the resin-hardener mixture ratio (for the epoxy adhesive) is outside of a pre-selected band, the bond will perform in a non-optimal manner. Therefore, the present disclosure provides apparatus for, and methods of, continuously monitoring the mixture ratio of multi-part fluids and, more particularly, two-part adhesives.

Figure 2:
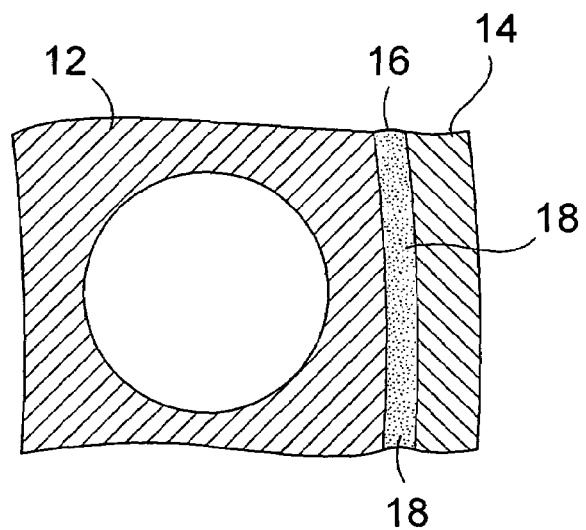
FIG. 2 illustrates a cross section of the structure of FIG. 1 taken along the line 2—2.

A joint 10 constructed in accordance with the principles of the present disclosure is illustrated by FIG. 1. The joint 10 includes two structures which, in FIG. 1, include a rib 12 and a panel 14. The structures 12 and 14 may be of any material suitable for adhesive bonding with the surfaces to be bonded prepared by, for example, cleaning, degreasing, or surface roughening. Between the rib 12 and the panel 14 a layer of adhesive 16 bonds the two structures together so that the adhesive 16 carries a load between the two structures 12 and 14. Due to operational considerations it may also be desired that the joint 10 allow heat or electricity to be conducted across the adhesive 16. Thus, the designer of the joint 10 typically calls for a two-part adhesive with conductive particles 18 (see FIG. 2) to be employed as the adhesive 16.

Figure 3:
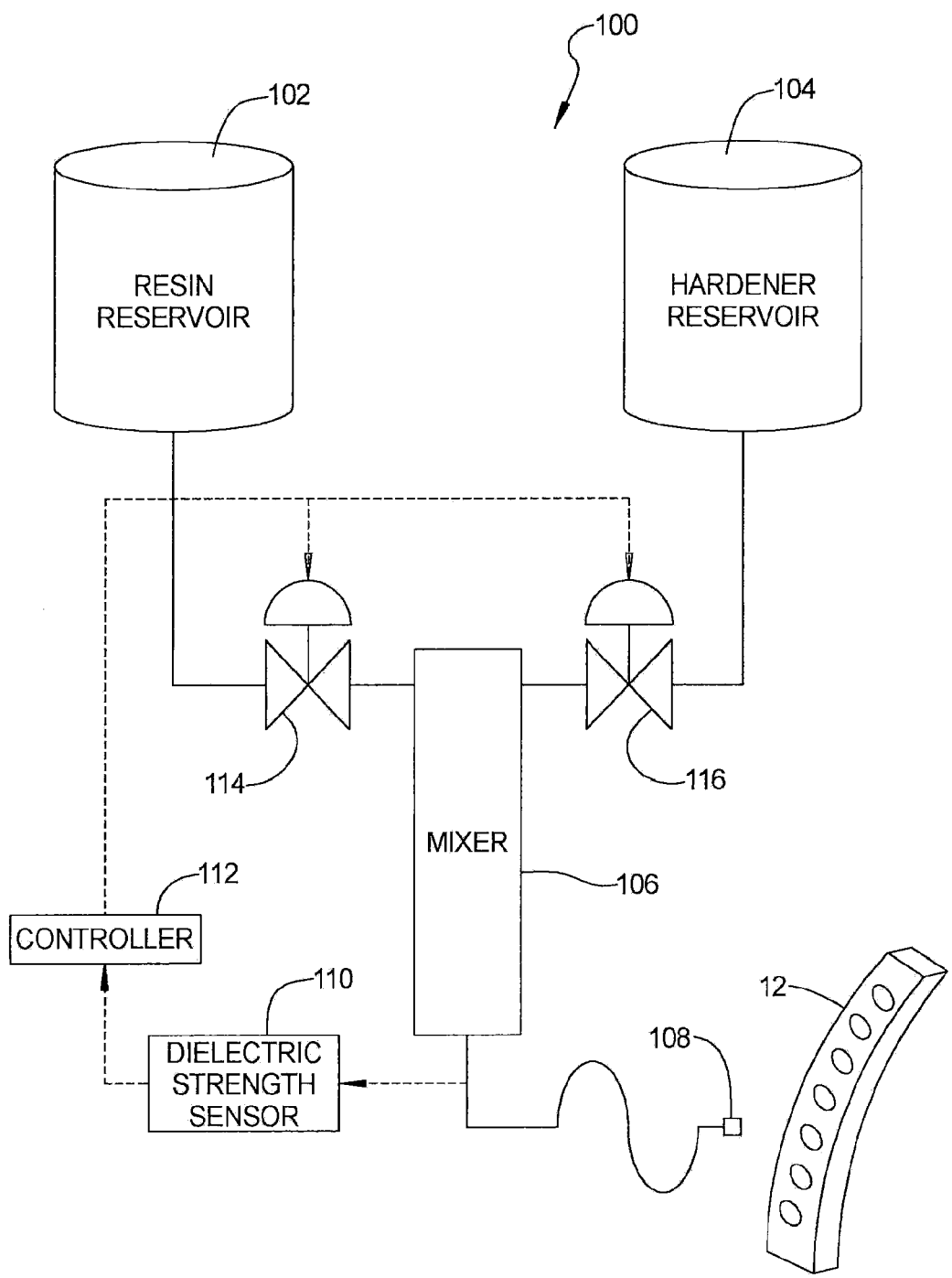
FIG. 3 illustrates a system constructed in accordance with one embodiment of the present disclosure.

FIG. 3 schematically illustrates a system for mixing a two-part fluid that is constructed in accordance with the principles of the present invention. For epoxies, the system 100 includes a resin reservoir 102, a hardener reservoir 104, a static mixer 106, a hose with applicator 108, a dielectric strength sensor 110, a controller 112, and a pair of fluid control devices (e.g. valves or metered pumps, orifices, or nozzles) 114 and 116 associated with the two reservoirs 102 and 104. The resin reservoir 102 and the hardener reservoir 104 feed resin and hardener, respectively, into the mixer 106 via the fluid control devices 114 and 116. The fluid control devices 114, 116 are configured to provide the resin and hardener at flow rates that ensure that the mixture ratio in the mixer 106 is at a preselected set-point. As the resin and hardener flow into the mixer 106 the mixer 106 begins mixing the two components (i.e. parts) of the two-part fluid. The mixing proceeds as the two parts flow through the length of the mixer 106 which is configured to ensure that complete mixing of the two parts occurs before the fluid exits the mixer 106.

Variations may occur in the flow rate of one, or both, of the resin and the hardener. Therefore, the system 100 includes the dielectric strength sensor 110 at the discharge of the mixer 106. The sensor 110 senses the dielectric strength of the mixed two-part fluid that flows between a pair of electrodes held in a spaced-apart relationship by a known distance. Because the distance between the electrodes and the configuration of the electrodes are known, the only variable that influences the capacitance of the sensor 110 is the dielectric strength of the two-part fluid between the electrodes. Further, because the dielectric strength of the fluid does not depend noticeably on the mixture ratio of the two-part fluid (absent the conductive particles), the only source of variation of the capacitance of the sensor 110 is the concentration of the conductive particles in the mixed fluid. Since the concentration of the conductive particles depends on the mixture ratio it is possible to determine the mixture ratio based on the sensed dielectric strength. Thus, the sensor 110 monitors the mixture ratio of the two-part fluid and sends a signal representative of the mixture ratio to the controller 112. In turn, the controller 112 compares the dielectric strength (or actual mixture ratio) to a user selected set-point and generates an error signal to drive the fluid control devices 114 and 116. As a result, the mixture ratio of the two-part fluid is under real-time, continuous, closed loop control. If the mixture ratio deviates from the set-point, the controller 112 can generate an audible or visual message to the operator and can even log the event.

While an exemplary adhesive is a two-part adhesive with conductive particles, the mixing of any multi-part fluid with conductive particles in at least one of the parts can be monitored in accordance with the principles of the present disclosure. For instance, the mixing of two-part polyurethanes, RTV rubbers, silicones, and acrylics, can be monitored in accordance with these principles. This list is not exhaustive and is not intended to limit the scope of the present disclosure. Nor is the scope of the disclosure limited to multi-part adhesives. The multi-part fluids of the present disclosure can be used to form coatings, elastomers, molded products, and many other products without departing from the scope of the present invention. The conductive particles may be made of any electrically conductive material. Aluminum is preferred in one embodiment although the particles can be made from any metal. Many of these two part fluids are commercially available and come with the conductive particles mixed into one of the parts. In the alternative, the user can mix the conductive particles into one part without departing from the scope of the present disclosure. The choice of materials (i.e. the parts of the fluid and the material of the conductive particles) is based on the end use to which the mixed fluid will be applied. Likewise, the concentration of conductive particles in the one part is determined generally by the requirements associated with the end use of the two part fluid (e.g. how much electrical resistance is to be allowed across a given adhesive joint). The system 100 is then adjusted to detect variations in the concentration of the particles (of the selected material) in the mixed fluid at the desired mixture ratio.

Figure 4:
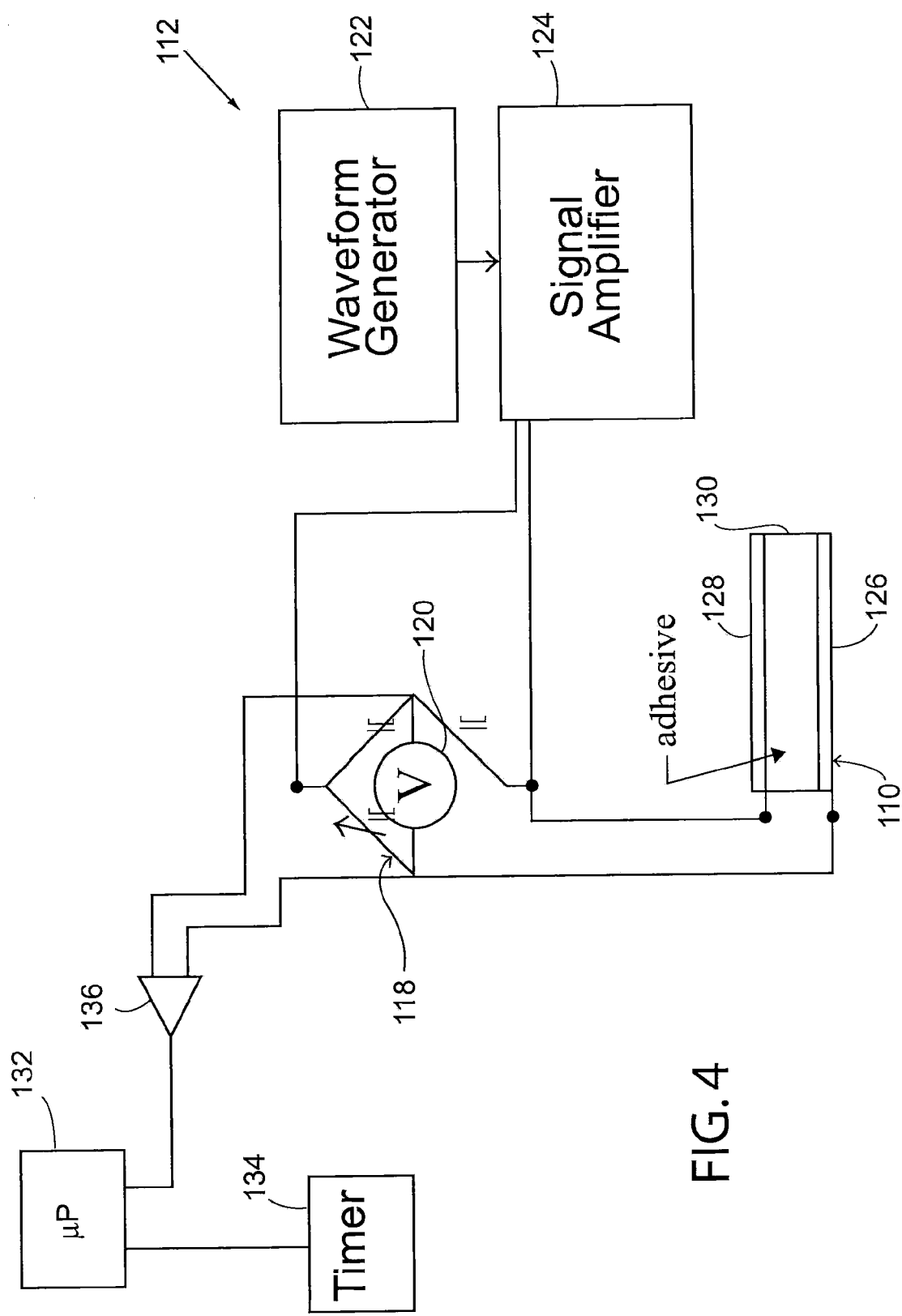
FIG. 4 illustrates a circuit constructed in accordance with another embodiment of the present disclosure.

With reference now to FIG. 4, the controller 112 is schematically illustrated and is responsive to, the sensor 110 of FIG. 3. Generally, the controller 112 includes a capacitive bridge 118, a volt meter 120, a waveform generator 122, and a signal amplifier 124. The sensor 110 further includes a pair of electrodes 126 and 128 and a volume between the electrodes through which the two-part fluid may flow to act as the dielectric. When installed in the system 100 of FIG. 3, the sensor 110 is configured so that the mixed two-part fluid from the mixer 106 fills the dielectric volume 130. Also, the electrodes 126 and 128 are connected to the capacitive bridge 118 so that the sensor 110 is seen by the volt meter 120 as a variable capacitor. The waveform generator 122 feeds the signal amplifier 124, which is in turn connected to one node of the capacitive bridge 118 and to one electrode 128 of the sensor 110, to impose a varying voltage across the sensor 110. Because of the varying dielectric strength of the fluid flowing through the sensor 110, a varying voltage difference indicative of the capacitance of the sensor 110 will develop across the bridge 118 and be sensed by the volt meter 120. Thus, the controller 112 allows the dielectric strength of the as-mixed, two-part fluid to be determined. As a result, the mixture ratio of the two-part fluid can be determined from the sensed voltage.

With continuing reference to FIG. 4, another embodiment of the controller 112 also includes a microprocessor 132, a timer 134, and a signal conditioner 136. The signal conditioner 136 is connected to allow the microprocessor 132 to sense the voltage measured by the volt meter 120. The timer 134 allows the microprocessor 132 to determine the time elapsed from the time that mixing of the two-part fluid began. As will be seen, the elapsed time can also bear on the determination of the mixture ratio. In the alternative, the timer 134 is obviated by knowing how long it takes the fluid to flow from the initial mixing point in the mixer 106 to the sensor 110. The time required for the fluid to travel between that point and the sensor 110 may be determined empirically or determined from the measured flow rates of the two parts (or of the two-part fluid).

Figure 5:
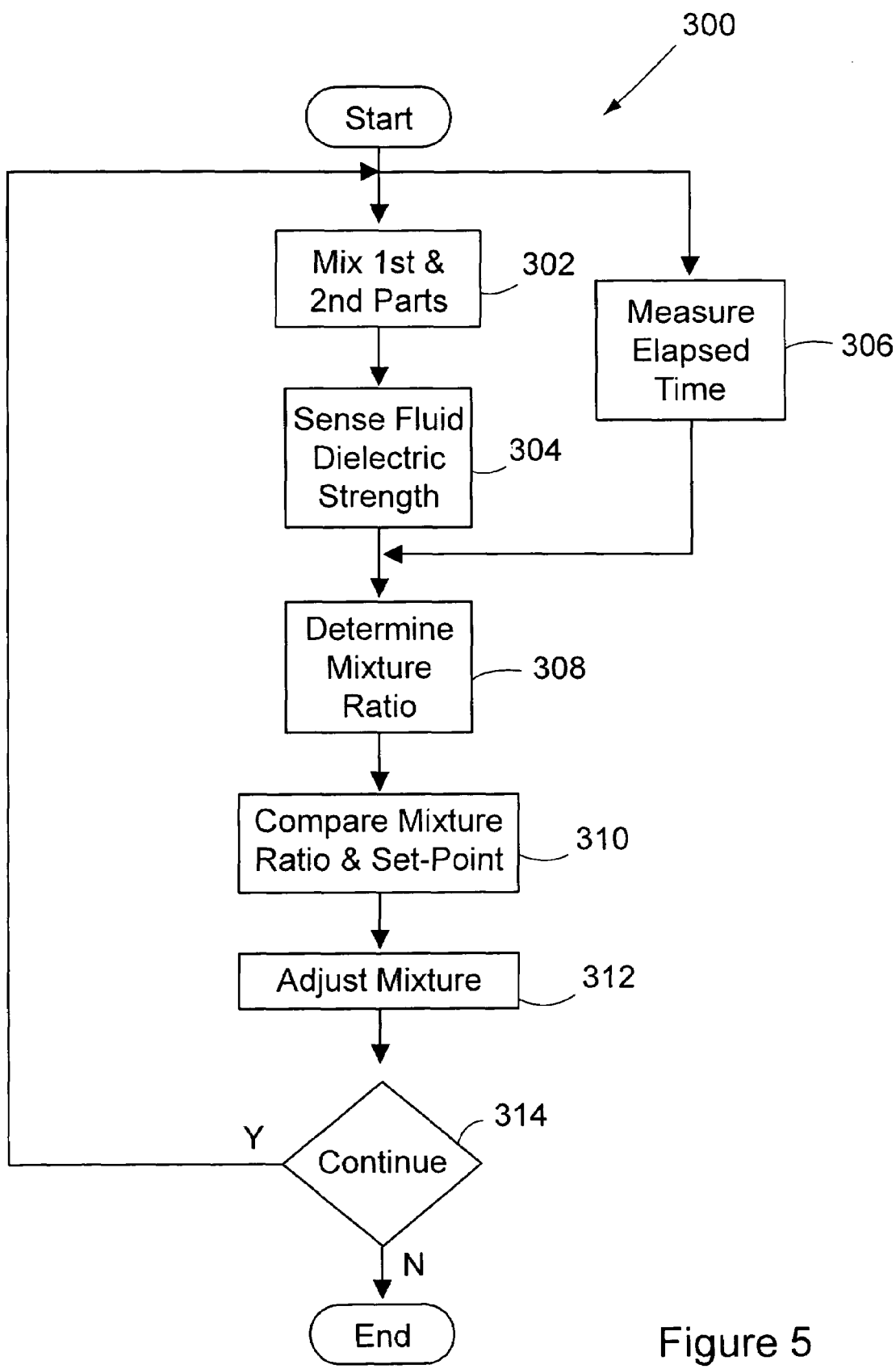
FIG. 5 illustrates a method in of the present disclosure.

Turning now to FIG. 5, a method in accordance with the present disclosure is illustrated. The method 300 generally includes mixing a two-part fluid, sensing the mixture ratio of the fluid, and adjusting the mixing process to maintain the mixture ratio at a set-point. More particularly, FIG. 5 shows the two-part fluid being mixed in operation 302 and the dielectric strength of the mixed fluid being sensed in operation 304. In operation, it has been found that the sensed dielectric strength decreases exponentially as the time from the beginning of the mixing increases. Therefore, it has been found helpful to begin a timer to measure the elapsed time since the mixing began as indicated at operation 306. From the sensed dielectric strength and the elapsed time, the mixture ratio can be determined, as performed at operation 308. A comparison can be made between the mixture ratio of the mixed fluid and the desired set-point as in operation 310. If necessary, or desired, the method 300 may repeat the operations 302, 304, 306, 308, 310, and 312 until the mixing of the two-part fluid is discontinued. See operation 314.

Figure 6:
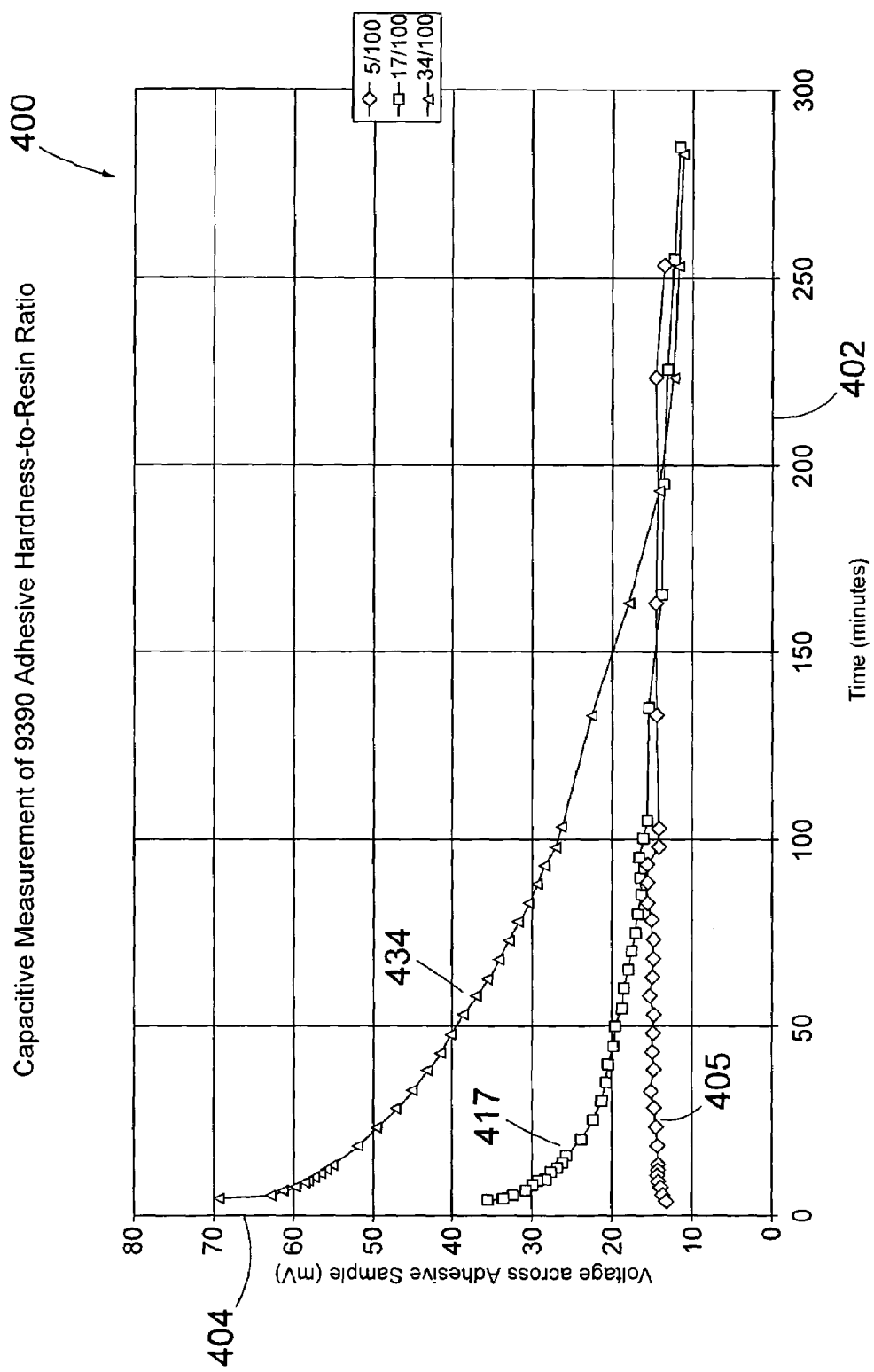
FIG. 6 illustrates the results of a test using the circuit of FIG. 4.

A test was performed to confirm that it is possible to sense the difference between the EA 9394 adhesive that is mixed properly and adhesive which is not mixed properly. A mixture ratio of hardener to resin of 17/100 (0.17) was used as the desired mixture ratio. Two other mixture ratios of the EA 9394 hardener and ratio were tested, namely 0.05 and 0.34. A sample of adhesive for each of the three mixture ratios was mixed thoroughly and injected into separate but otherwise identical test cells. The dielectric strength of each sample was measured over time using the capacitive bridge 118 of FIG. 4 operating with a 10 kHz sinusoidal signal as supplied by the waveform generator 122 and signal amplifier 124. The peak-to-peak voltage across the bridge 118 was measured with the volt meter 120. FIG. 6 shows the results of the test.

The x-axis 402 of the graph 400 of FIG. 6 indicates the elapsed time from the beginning of the mixing of the samples. The y-axis shows the peak-to-peak voltage across the bridge 118. The curves 405, 417 and 434 show the results for the 0.05, 0.17, and 0.34 mixture ratio samples, respectively. As is apparent, there is a characteristic decay in the voltage as a function of time from the initiation of the mixing. Despite the decay, a large voltage difference exists between the curves 405, 417, and 434 for at least the first hour and longer. Thus, both the voltage and the elapsed time can be measured to determine whether the measured voltage for a given sample is tracking on the 417 curve (or other curve corresponding to a desired mixture ratio). Note should also be made that the curves 405, 417, and 434 indicate that within the first few minutes the controlled 112 was able to detect a 2 mV difference in the measured voltage per a 0.01 change in the mixture ratio. This result is sufficiently detectable that the difference in mixture ratios may be sensed with commercially available instrumentation.

Thus, an in-line adhesive mixing monitor such as the sensor 110 of FIGS. 3 and 4 can be employed to monitor the mixture ratio of a two-part fluid. Further, the monitoring can be performed continuously and in real time. In one embodiment the sensor 110 can be constructed from a pair of electrodes and a housing which holds the electrodes a pre-selected distance apart with the two-part fluid flowing between the electrodes. If the fluid system is pressurized, the housing can also be configured to contain the pressure while holding the electrodes in the spaced-apart relationship. Appropriate fluid fittings can also be included with the housing. A capacitive bridge may then be connected across the electrodes and, with shielding to prevent extraneous signals from interfering, used to sense the dielectric strength of the fluid. Additionally, a microprocessor, such as the microprocessor 132 of FIG. 4, may be employed to sense the dielectric strength (or the peak-to-peak voltage across the sensor 110) of the two-part fluid, determine the elapsed time (from timer 134), and determine the mixture ratio.

In view of the foregoing, it will be seen that the several advantages are achieved. More particularly, apparatus and methods have been provided to determine continuously, and in real time, the mixture ratio of a two-part fluid. Further, the joints created with the two-part fluid are improved because the mixture ratio of the fluid can now be held at a pre-selected set-point to ensure that the optimal load-bearing and conductive properties of the two-part adhesives are optimal. Because the adhesive remains optimal throughout its application to the joint, the amount of adhesive used can be reduced to lighten the joint without sacrificing joint strength. Accordingly, the payload carrying capacity of mobile vehicles (e.g. aircraft or spacecraft) constructed using the present disclosure can be increased.

The embodiments were chosen and described in order to best explain the principles of the disclosure and its practical application, to thereby enable others skilled in the art to best utilize the invention in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A system for monitoring a mixture ratio of a two-part fluid, at least one of the two parts of the fluid including conductive particles, the two parts to be mixed to make the two-part fluid, the concentrations of the two parts in the two-part fluid defining the mixture ratio, the system comprising:

a pair of electrodes to be disposed on opposite sides of at least a portion of the two-part fluid made by mixing the two parts, wherein the two-part fluid forms a dielectric and said pair of electrodes and the dielectric operate as a capacitor;

a controller communicating with the capacitor in a manner so that the capacitance of the capacitor as sensed by the circuit varies as a function of the mixture ratio of the two-part fluid;

an output from the capacitor communicating with the controller and being representative of the mixture ratio of the two-part fluid; and a timer in communication with said controller for measuring a time where a mixing of said two parts of said fluid began and a time at which sensing of said two-part fluid is made.

2. The system according to claim 1, further comprising a capacitive bridge in communication with said control and said capacitor.

3. The system according to claim 1, further comprising an input for a user selectable mixture ratio set-point.

4. The system according to claim 3, further comprising the output being a first output, the controller being adapted to compare the signal representative of the mixture ratio to the set-point, the system including a second output adapted to output a signal representative of the comparison between the mixture ratio and the set-point.

5. The system according to claim 1, further comprising a housing for the pair of electrodes, the housing including a fluid fitting adapted to receive the portion of the two-part fluid and to dispose the pair of electrodes on the opposite sides of the portion of the two-part fluid.

6. The system according to claim 1, further comprising, the controller including an input to accept a signal representative of the time that the mixing of the two parts of the two-part fluid began, the input adapted to trigger the timer, the timer further being adapted to output a signal representative of a time from a beginning of the mixing of the two parts.

7. The system according to claim 1, wherein the two-part fluid comprises an adhesive.

8. The system according to claim 1 wherein the conductive particles comprise aluminum.

9. The system according to claim 1 wherein the first part of the fluid comprises a resin and the second part of the two-part fluid comprises a hardener.

10. A method of producing a two-part fluid, the method comprising:

mixing a first part and a second part of the two-part fluid, the first part to include a plurality of conductive particles dispersed in the first part;

sensing a dielectric strength of the mixture of the first part and the second part in manner so that the dielectric strength sensed by the circuit varies as a function of the mixture ratio of the two-part fluid;

determining a mixture ratio associated with the two-part fluid from the sensed dielectric strength; and measuring the time from when the mixing began to when the sensing occurs.

11. The method according to claim 10, further comprising adjusting the mixing based on the mixture ratio determined from the sensed dielectric strength.

12. The method according to claim 10, further comprising selecting a set-point for the mixture ratio.

13. The method according to claim 10, wherein mixing the two-part fluid comprises mixing a two-part fluid to form an adhesive.

14. The method according to claim 10 wherein the conductive particles are aluminum.

15. The method according to claim 10 wherein the first part of the fluid is a resin and the second part of the two-part fluid is a hardener.

16. A two-part fluid producing system, comprising:

a first source for a first part of the two-part fluid, the first part including a plurality of conductive particles;

a second source for a second part of the two-part fluid;

a mixer communicating with the first source and the second source and adapted to mix a portion of the first part with a portion of the second part to produce the two-part fluid;

a sensor communicating with the mixer to receive the two-part fluid and to sense the dielectric strength of the two-part fluid in a manner so that the dielectric strength sensed by the circuit varies as a function of the mixture ratio of the two-part fluid; and a controller communicating with the sensor to output a signal representative of the mixture ratio of the fluid; and a timer in communication with the sensor to determine a time between when the two-part fluid was mixed and when sensing of said two-part fluid by said sensor occurred.

17. The system according to claim 16, further comprising a fluid control device communicating with the first source and the mixer and adapted to adjust the first portion of the first part to be mixed with the second part by the mixer.

18. The system according to claim 17, further comprising an input for accepting a user selected set-point for the mixture ratio of the two-part fluid, the output being a first output, the system further including a second output to output a signal representative of a comparison between the set-point and the sensed dielectric strength, the fluid control device being responsive to the signal that is representative of the comparison.

19. The system according to claim 16, wherein the two-part fluid comprises an adhesive.

20. The system according to claim 16, further comprising a timer adapted to measure the time since the mixer began mixing the first part and the second part of the two-part fluid.

* * * * *